May 9, 1933. F. B. WALDRON 1,908,580
APPARATUS FOR GRINDING AND POLISHING GLASS PLATES
Filed Oct. 21, 1929
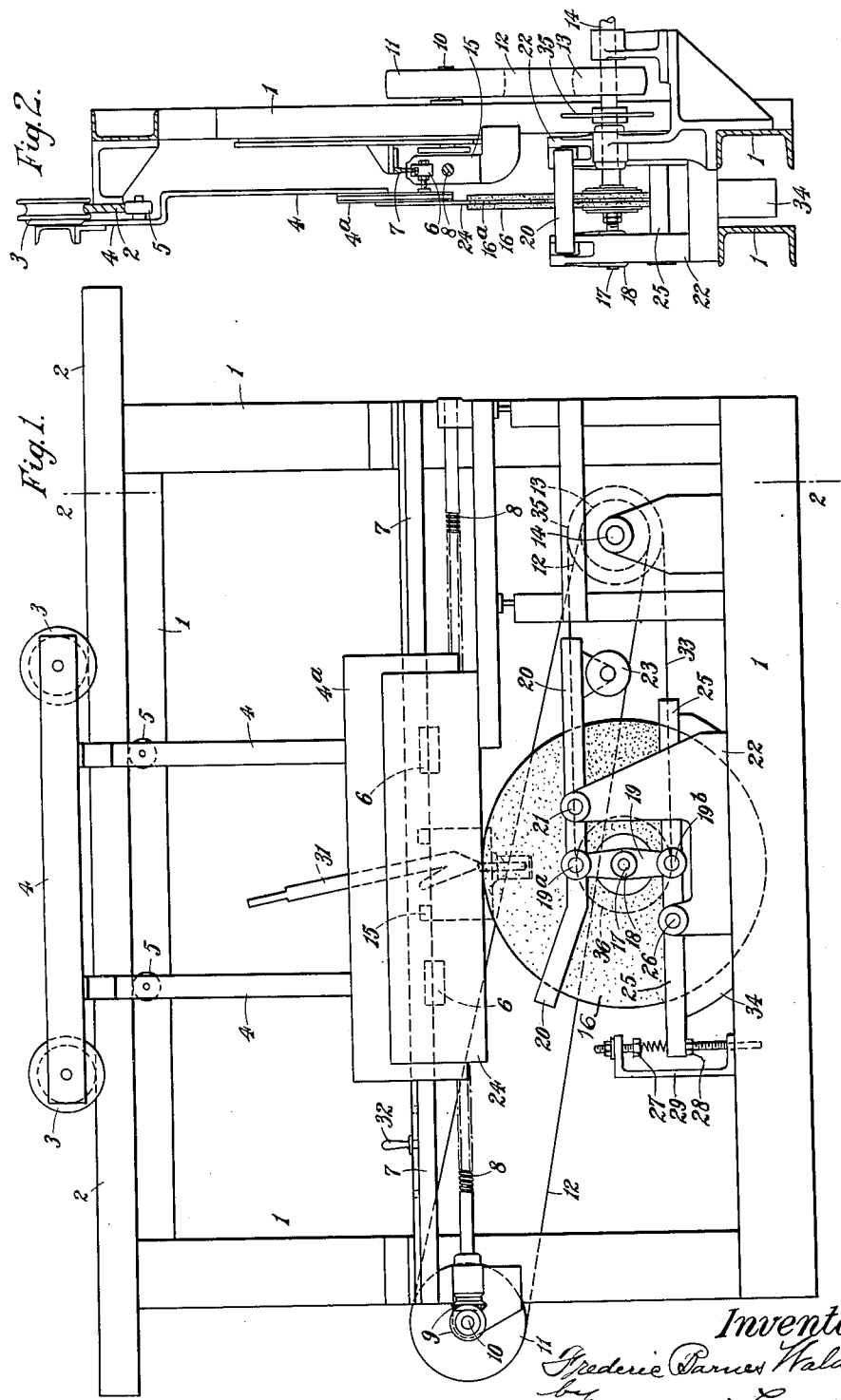
Inventor.
Frederic Barnes Waldron
by
Morrison, Kennedy & Campbell
Attorneys.

Patented May 9, 1933

1,908,580

UNITED STATES PATENT OFFICE

FREDERIC BARNES WALDRON, OF PRESCOT, ENGLAND, ASSIGNOR TO PILKINGTON BROTHERS LIMITED, OF LIVERPOOL, ENGLAND, A COMPANY OF ENGLAND

APPARATUS FOR GRINDING AND POLISHING GLASS PLATES

Application filed October 21, 1929, Serial No. 401,084, and in Great Britain October 30, 1928.

This invention relates to the grinding and polishing of glass plates. It is particularly concerned with apparatus in which the shaping and polishing of the edges of flat glass plates are effected by the movement of a plate-edge lengthwise relatively to and in operative contact with the periphery of a rotating grinding or polishing disc adapted to produce on the edge of the plate the desired shape and polish.

Apparatus for carrying out the invention, primarily comprises a frame or support to which a glass plate may be secured, means for moving the frame to traverse an edge of the supported plate over or past the shaping and polishing tool, and means whereby the tool is held, yieldingly, against said edge during the travel of the latter past the tool. Provision may be made, if desired, to limit the movement of the tool towards and away from the work.

The invention will now be described by reference to the accompanying drawing in which:—

Figure 1 is a front elevation of one constructional form of the improved apparatus, adapted to round and polish the edges of the glass plates, and Figure 2 is a vertical section taken on the line 2—2 of Figure 1 and viewed as looking towards the left, and with certain parts shown in Figure 1, omitted.

The apparatus as here illustrated comprises a rigid main frame 1, having attached to its upper part, a horizontal track or rail 2 along which are free to run grooved rollers 3 pivotally attached to the top rail of a frame 4. This frame 4, which for convenience is hereinafter termed a carriage, is free to travel horizontally along the track 2, and is prevented from dissociation from said track, in a vertical sense, by rollers 5, pivotally attached to the carriage 4 and underlying the track 2.

The lower end of the carriage 4 takes the form of a glass carrier 4ª to which the glass may be attached by any convenient means, such as suckers, which are embodied in, or constitute the said carrier, while, at this lower end, the carriage 4 is guided in its traversing movements, by shoes or jaws 6 secured to the back of the glass carrier 4ª, which engage with a rail or plate 7 rigidly mounted on the frame 1, as shown best in Figure 2.

The carriage 4 is traversed along the rails 2 and 7, by a horizontal lead screw 8 which is rotated through mitre gearing 9 by a shaft 10 on which is secured a belt pulley 11 which, through a belt 12 and driving pulley 13, is itself rotated from the main driving shaft 14.

The lead screw 8 engages with a nut which is diagrammatically indicated at 15 in Figure 1 and means are preferably provided whereby, at the end of the operative journey of the carriage 4, the nut (conveniently in two portions) is automatically disengaged from the lead screw to bring the carriage to a standstill. Said means may, for example, comprise a pivoted arm 31, which is turned by coming into contact with a fixed stop 32, and controls the movement of a cam plate by which the two portions of the nut are moved in respectively opposite directions for disengagement from the screw.

The shaping and polishing tool 16 of natural or artificial stone and in the form of a disc, has, in its periphery a groove 16ª of the desired shape, and is mounted on a shaft 17 rotatably supported in bearings 18 formed centrally in links 19 pivotally suspended at 19ª from the sides of a swinging frame 20 which is itself pivoted by studs 21 to the upstanding arms of a pedestal bracket 22 rigidly secured to the base of the main frame 1.

The swinging frame 20 carries a counterweight 23 which causes the stone 16 to bear upwards with an adequate pressure, against the lower edge of the glass plate 24 whilst the latter is being traversed over the stone; the counterweight, however, permits the stone to yield and fall back in the event of the working pressure between the glass and stone being exceeded.

It is preferred that the movement of the stone 16 under the influence of the counterweight 23 be constrained in a vertical sense, and that result may be conveniently attained by pivoting the lower ends of the links 19 at 19^b to a second swinging frame 25 which at 26, is pivotted to the pedestal bracket 22, the radii 19^a—21 and 19^b—26 being equal, so that these associated parts constitute a parallel motion device.

The driving belt 33 passes through the centre lines of the two frame pivots 21 and 26, and consequently the tension in the belt exercises no force tending to press the frame towards or away from the work.

In conjunction with the foregoing arrangements it is considered desirable to provide stops for limiting the vertical motion impartible to the stone and that these stops shall be adjustable to permit of any such variations being made as may be called for by, for example, the wearing away of the stone. This provision may be satisfied by two set screws 27, 28, independently adjustable in a fixed standard 29 and having lock nuts for retaining them in their respective adjusted positions. If desired, these stop devices may be supplemented by a buffer spring 30 adapted to engage with the upper set screw 27, by means of which the pressure of the stone and the glass may be adjusted.

The stone 16 may receive its rotary motion through sprocket wheels 35, 36, fast on the shafts 14 and 17 respectively, and a pitch chain 33 encircling both of said wheels, and it may rotate in a water-containing trough 34 attached to the frame 25.

Having described my invention, I declare that what I claim and desire to secure by Letters Patent is:—

1. Apparatus for giving glass plates accurate rectilinear edges by grinding, comprising a support to which a glass plate is rigidly attached, guides constraining the support to move rectilinearly, means for traversing the support along the guides, a grinding wheel rotating in the plane of the plate, a frame on which the wheel is mounted adapted to move to and from the edge of the plate, a fixed stop limiting the movement of the frame towards the edge of the plate, yielding means adapted normally to maintain the frame in contact with the stop.

2. Apparatus for giving plates accurate rectilinear edges by grinding, said apparatus comprising in combination a support adapted to have a glass plate rigidly attached to it and being movable in a rectilinear path, means for traversing said support along said path in passing the glass plate through the machine, a grinding wheel carrying-frame, a grinding wheel rotatable on said frame in the plane of the glass plate, means for rotating said grinding wheel, said carrying-frame being movable to carry the grinding wheel to and from the edge of the plate, a fixed stop in position to be engaged by said carrying-frame to limit the movement of the grinding wheel toward the edge of the plate and serving to determine the operative grinding relation of the wheel to the edge of the plate, and pressure means acting on said carrying-frame and operating to hold it yieldingly against said stop, whereby the degree of pressure on the carrying-frame and rate of travel of the plate support may be set at such predetermined values, that normal irregularities in the edge of a glass plate carried by the support, will be ground away while the carrying-frame is maintained in contact with said stop, and the grinding wheel will yield and the carrying-frame disengage the stop only on the engagement of the wheel by abnormalities in the edge of a plate, so that glass plates whose edges contain normal irregularities will be ground rectilinearly in their passage through the machine, and plates of glass containing abnormalities in their edges, will pass through the machine without being subjected to sufficient heat in the action of the grinding wheel on such abnormalities as would cause the breakage of the plates.

3. Apparatus for giving plates accurate rectilinear edges by grinding, said apparatus comprising in combination, a main frame having guides, a support adapted to have a glass plate rigidly attached to it, said support being movably mounted on said guides and constrained in its movements to a rectilinear path, means for traversing the support along the guides, a grinding wheel carrying-frame mounted in said main frame, a grinding wheel mounted in the carrying-frame and rotatable therein in the plane of the glass plate, means for rotating said grinding wheel, said carrying-frame being movable to carry the grinding wheel to and from the edge of the glass plate, a fixed stop on the main frame in position to be engaged by said carrying-frame to limit the movement of the grinding wheel toward the edge of the of the grinding wheel toward the edge of the plate and serving to determine the operative grinding relation of the wheel to the edge of the plate, and pressure means acting on the carrying-frame and operating to hold it yieldingly against said stop; whereby the degree of pressure on the carrying frame and rate of travel of the plate support may be set at such predetermined values, that normal irregularities in the edge of a plate carried by said support will be ground away while the carrying-frame is maintained in contact with the stop, and the grinding wheel will yield only in the event of the engagement of the wheel by abnormalities in the edge of a plate, so that glass plates whose edges contain normal irregularities will be ground rectilinearly in their passage through the machine, and plates of glass containing abnormalities in their edges pass through the machine without being subjected to sufficient heat in the action of the grinding wheel on such abnormalities as would cause breakage of the plates.

4. Apparatus for giving glass plates accurate rectilinear edges by grinding, comprising in combination a support to which a glass plate is adapted to be rigidly attached, means for moving said support along a rectilinear path, a grinding wheel carrying-frame having a parallel movement to and from the plate on the support, a grinding wheel mounted on said carrying-frame and rotatable thereon in the plane of said glass plate, means for rotating the grinding wheel, a fixed stop in position to be engaged by the carrying-frame to limit the movement of the grinding wheel toward the edge of the plate and serving to determine the operative grinding relation of the wheel to the edge of the plate, and pressure means acting on the carrying-frame and operating to hold it yieldingly against said stop; whereby the degree of pressure on the carrying-frame and rate of travel of the plate support may be set at such predetermined values, that normal irregularities in the edge of a plate carried by the support will be ground away while the carrying frame is maintained in contact with the stop, and the grinding wheel will yield only in the event of the engagement of the wheel by abnormalities in the edge of a plate.

5. Apparatus for giving glass plates accurate rectilinear edges by grinding, comprising a support to which a glass plate is adapted to be rigidly attached, means for moving said support along a rectilinear path, a grinding wheel carrying-frame comprising two bars parallel to each other pivoted respectively on axes offset at equal distances from a neutral line between said axes, and a link pivoted to said bars on axes intersecting said neutral line, whereby the frame is capable of parallel movement to and from the glass plate on its support, a grinding wheel journalled on said link of the carrying frame and rotatable in the plane of the glass plate, means for rotating said wheel, a fixed stop in position to be engaged by said carrying frame to limit the movement of the grinding wheel toward the edge of the plate and serving to determine the operative grinding relation of the wheel to the edge of the plate, and pressure means acting on the carrying frame and operating to hold it yieldingly against said stop only under conditions of normal grinding.

In witness whereof I have affixed my signature hereto.

FREDERIC BARNES WALDRON.